US008435632B2

(12) United States Patent
Wu et al.

(10) Patent No.: US 8,435,632 B2
(45) **Date of Patent: *May 7, 2013**

(54) INTERMEDIATE TRANSFER MEMBER

(75) Inventors: Jin Wu, Pittsford, NY (US); Lanhui Zhang, Webster, NY (US); Lin Ma, Pittsford, NY (US); Ryan Ehmann, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 557 days.

This patent is subject to a terminal disclaimer.

(21) Appl. No.: 12/720,838

(22) Filed: Mar. 10, 2010

(65) Prior Publication Data

US 2011/0223436 A1 Sep. 15, 2011

(51) Int. Cl.
*B32B 5/16* (2006.01)
*B05D 3/02* (2006.01)

(52) U.S. Cl.
USPC ........... 428/328; 427/387; 428/331; 428/334; 428/335; 428/425.5; 428/412

(58) Field of Classification Search .................. 428/328, 428/331, 334, 335, 412, 421, 425.5, 447, 428/451; 427/387
See application file for complete search history.

(56) References Cited

U.S. PATENT DOCUMENTS

| | | | |
|---|---|---|---|
| 7,280,791 | B2 | 10/2007 | Goodman et al. |
| 7,781,132 | B2 | 8/2010 | Yanus et al. |
| 7,985,464 | B2 | 7/2011 | Wu |
| 8,012,583 | B2 | 9/2011 | Wu |
| 2004/0214046 | A1 | 10/2004 | Ejiri et al. |
| 2008/0107979 | A1 | 5/2008 | Yanus et al. |
| 2010/0028059 | A1 | 2/2010 | Wu |
| 2010/0028700 | A1 | 2/2010 | Wu |
| 2010/0055445 | A1 | 3/2010 | Wu |
| 2011/0027589 | A1 | 2/2011 | Wu |
| 2011/0223436 | A1 | 9/2011 | Wu et al. |

OTHER PUBLICATIONS

U.S. Appl. No. 12/720,840, filed Mar. 10, 2010, Final Office Action dated Apr. 12, 2012.

U.S. Appl. No. 12/720,840, filed Mar. 10, 2010, Office Action dated Oct. 12, 2011.

*Primary Examiner* — D. S. Nakarani
(74) *Attorney, Agent, or Firm* — Hoffman Warnick LLC

(57) ABSTRACT

There is provided herein an intermediate transfer member. This intermediate transfer member includes a substrate layer. A surface layer is disposed on the substrate layer is disposed on the substrate layer and includes conductive particles having thereon a shell comprising a polyhedral oligomeric silsequioxane dispersed in a polymer. A method of manufacturing and intermediate transfer member is also disclosed.

17 Claims, 2 Drawing Sheets

INTERMEDIATE TRANSFER MEMBER

BACKGROUND

1. Field of Use

This disclosure is directed to an image forming apparatus and an intermediate transfer member.

2. Background

Image forming apparatuses in which a color or black and white image is formed by using an intermediate transfer member to electrostatically transfer toner are well known. When an image is formed on a sheet of paper in a color image forming apparatus using such an intermediate transfer member, four color images in yellow, magenta, cyan and black respectively are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor and superimposed on an intermediate transfer member, and then transferred to a sheet of paper.

An intermediate transfer member is required in an image-forming apparatus.

SUMMARY

According to one embodiment, an intermediate transfer member is provided. This intermediate transfer member includes a substrate layer. A surface layer is disposed on the substrate layer including conductive particles having thereon a shell comprising a polyhedral oligomeric silsequioxane (POSS) dispersed in a polymer.

According to an embodiment there is provided a method of manufacturing an intermediate transfer member. The method includes mixing conductive particles, a functionalized polyhedral oligomeric silsequioxane (POSS) and a solvent to form a mixture. The mixture is heated and filtered, then the mixture is washed to obtain conductive particles with a POSS shell. The conductive particles with a POSS shell are dispersed in a polymer to form a dispersion. The dispersion is coated on a substrate and dried.

According to an embodiment there is provided an intermediate transfer member. The intermediate transfer member includes a substrate layer and a surface layer disposed on the substrate layer. The surface layer includes conductive particles having a shell comprising a polyhedral oligomeric silsequioxane, dispersed in a polymer. The surface layer has surface contact angle of greater than 80° and a surface resistivity of from about $10^8$ Ω/square to about $10^{13}$ Ω/square and a thickness of from about 1 micron to about 150 microns.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
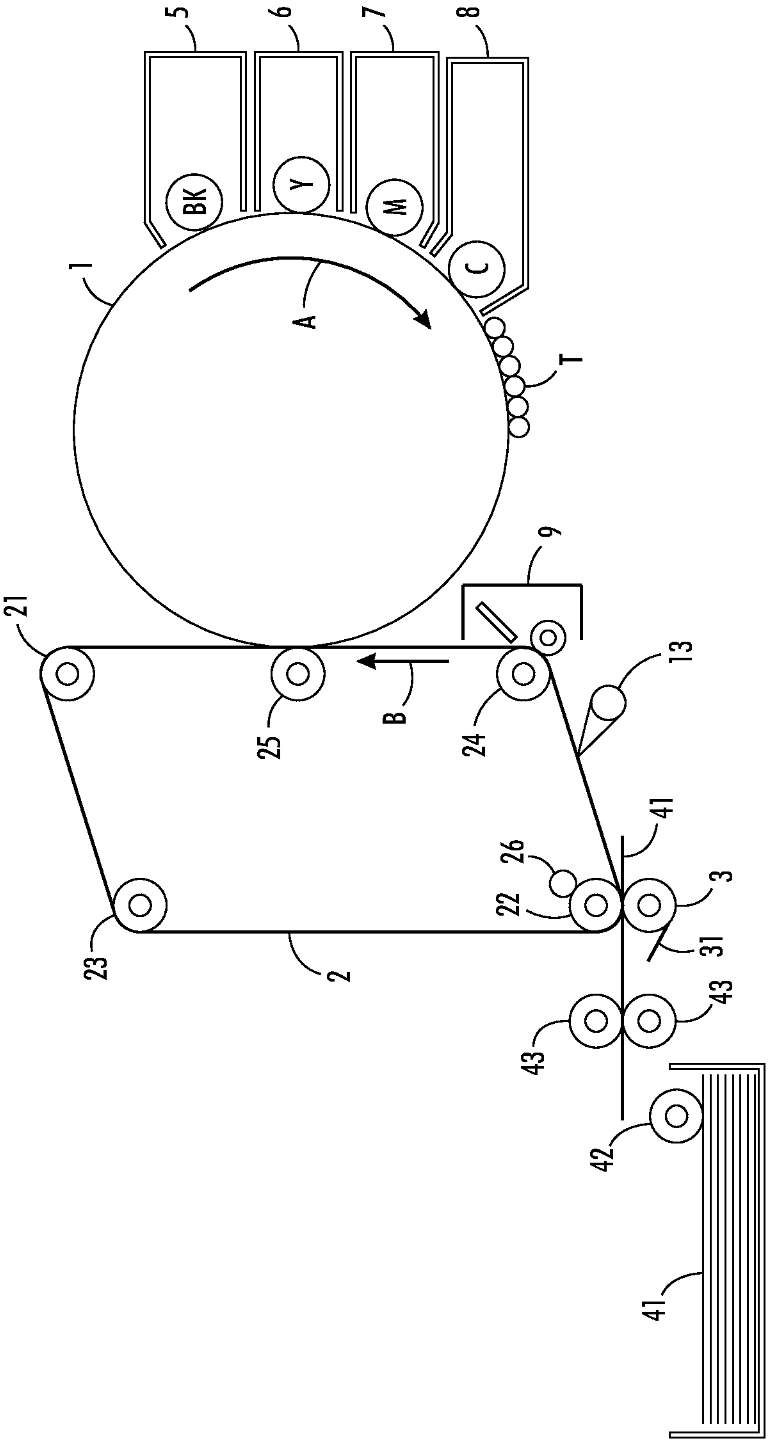
FIG. 1 is a schematic illustration of an image apparatus.

Referring to FIG. 1, an image forming apparatus includes an intermediate transfer member as described in more detail below. The image forming apparatus is an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also, in the image forming apparatus, the intermediate transfer member may be provided as a transfer-conveying member in the transfer region for transferring the toner image onto the transfer material. Having an intermediate transfer member that transfers images of high quality and remains stable for a long period is required.

The image forming apparatus described herein is not particularly limited as far as it is an image forming apparatus of intermediate transfer type, and examples include an ordinary monochromatic image forming apparatus accommodating only a monochromatic color in the developing device, a color image forming apparatus for repeating primary transfer of the toner image carried on the image carrier sequentially on the intermediate transfer member, and a tandem color image forming apparatus having plural image carriers with developing units of each color disposed in series on the intermediate transfer member. More specifically, the image forming apparatus may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and other known methods as required.

As the image carrier, a known one may be used. As the image carrier's photosensitive layer, an organic system, amorphous silicon, or other known material may be used. In the case of an image carrier of cylindrical type, the image carrier is obtained by a known method of molding aluminum or aluminum alloy by extrusion and processing the surface. A belt form image carrier may also be used.

The charging unit is not particularly limited and known chargers may be used, such as a contact type charger using conductive or semiconductive roller, brush, film and rubber blade, scorotron charger or corotron charge making use of corona discharge, and others. Above all, the contact type charging unit is preferred from the viewpoint of excellent charge compensation capability. The charging unit usually applies DC current to the electrophotographic photosensitive material, but AC current may be further superimposed.

The exposure unit is not particularly limited, for example, an optical system device, which exposes a desired image on the surface of the electrophotographic photosensitive material by using a light source such as semiconductor laser beam, LED beam, liquid crystal shutter beam or the like, or through a polygonal mirror from such light source, may be used.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used.

The second transfer unit may be the same as the first transfer unit, such as a contact type transfer charger using transfer roller and others, scorotron transfer charger, and corotron transfer charger. By pressing firmly using the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be performed.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image forming apparatus for repeating primary transfer is shown schematically in FIG. 1. The image forming apparatus shown in FIG. 1 includes a photosensitive drum 1 as image carrier, an intermediate transfer member 2, shown as an intermediate transfer belt, a bias roller 3 as transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the intermediate transfer member 2, and the primary transfer is executed by rotation of the intermediate transfer member 2 in the direction of arrow B.

Similarly, a toner image of a second color, a toner image of a third color, and a toner image of a fourth color are sequentially formed and overlaid on the transfer belt 2, and a multi-layer toner image is formed.

The multi-layer toner image transferred on the transfer belt 2 is brought to the secondary transfer unit comprising the bias roller 3 by rotation of the transfer belt 2. The secondary transfer unit comprises the bias roller 3 disposed at the surface side carrying the toner image of the transfer belt 2, backup roller 22 disposed to face the bias roller 3 from the back side of the transfer belt 2, and electrode roller 26 rotating in tight contact with the backup roller 22.

The paper 41 is taken out one by one from the paper block accommodated in the paper tray 4 by means of the pickup roller 42, and is fed into the space between the transfer belt 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31, made of polyurethane or the like, may be always in contact, and toner particles, paper dust, and other foreign matter sticking by transfer are removed.

In the case of transfer of a monochromatic image, the toner image T after primary transfer is immediately sent to the secondary transfer process, and is conveyed to the fixing device. But in the case of transfer of a multi-color image by combination of plural colors, the rotation of the intermediate transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and intermediate transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a drelt (a cross between and drum and a belt), a belt including an endless belt, an endless seamed flexible belt, an endless seamless flexible imaging belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a drelt, a circular disc, a belt including an endless belt, an endless seamed flexible belt, and an endless seamed flexible belt.

Typically, a conductive filler such as carbon black or conductive metal oxide is dispersed in the intermediate transfer member to control the resistivity. The resistivity of an intermediate transfer member containing carbon black is relatively stable as humidity fluctuates; however, carbon black is very difficult to use in manufacturing an intermediate transfer member. This is due to carbon black loading in an intermediate transfer member being on the vertical part of the percolation curve. Small changes in the amount of carbon black lead to large changes in the resistivity of the intermediate transfer member. The amount of carbon black and how carbon black is processed (primary particle size and aggregate size) are very critical for carbon black conductivity and the resulting resistivity of the intermediate transfer member. The working window for carbon black is very narrow and it is difficult to implement a robust manufacturing process. In contrast, the resistivity of conductive metal oxide intermediate transfer member is linearly dependent on the conductive metal oxide loading. Thus a consistent resistivity can be readily achieved. However, conductive metal oxides absorb water and suffer from resistivity changes in high humidity environments.

By coating a conductive metal oxide core particles with a polyhedral oligomeric silsequioxane (POSS) functionalized shell and dispersing the core-shell particles in polymer, an intermediate transfer member that has a stable resistivity in high humidity environments is provided.

In addition, intermediate transfer members containing particles of conductive metal oxide core having a POSS shell dispersed in a polymer possess excellent mechanical properties. Furthermore, the disclosed core shell conductive particles provide an intermediate transfer member that is hydrophobic, that is, having a water contact angle greater than about 80°, or greater than about 90°, or greater than about 100°, which benefits toner transfer and cleaning. Typical intermediate transfer members containing carbon black have a water contact angle of from about 70° to about 80° for example, a carbon black/polycarbonate intermediate transfer member having a water contact angle of about 75°.

Figure 2:
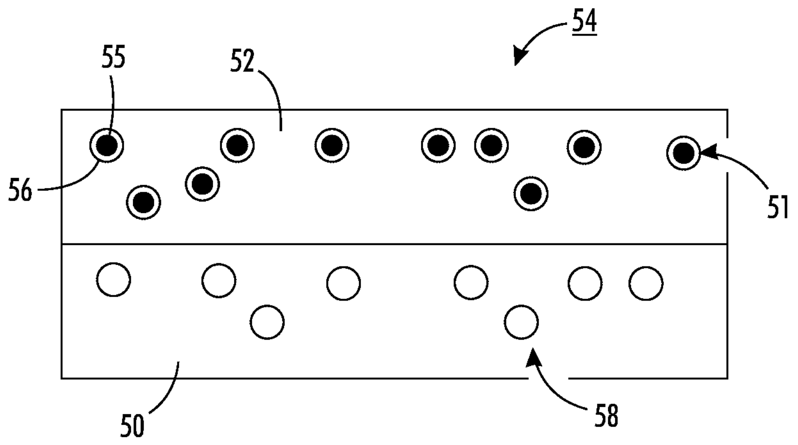
FIG. 2 is a schematic representation of an embodiment disclosed herein.

In an embodiment shown in FIG. 2, the intermediate transfer member 54 is in the form of a film in a two layer configuration. The intermediate transfer member 54 includes a first polymer layer 50. An outer polymer layer 52 is positioned on the first polymer layer 50. The outer polymer layer 52 contains conductive filler particles 51. The conductive filler particles 51 include a conductive metal oxide core 55, surrounded by a shell 56 of functionalized polyhedral oligomeric silsequioxane (POSS). The functionalized POSS shell 56 is chemically grafted onto or attached to the surface of the conductive metal core 55. Functional POSS such as POSS silanols, POSS alcohols, POSS amines, POSS carboxylic acids or POSS epoxides are used to form the shell 56 on the conductive metal oxide core 55. In the first polymer layer 50, particles 58 are shown. These can be selected from a wide variety as described below. The particles 58 can also include the conductive filer particles 51 that include a conductive metal oxide core 55, surrounded by a shell 56 of functionalized polyhedral oligomeric silsequioxane (POSS).

The core shell conductive metal oxide particle 51 is prepared by chemical attachment of a functional POSS, such as POSS silanol, onto the metal oxide surface. The POSS core shell conductive metal oxide particle can be used alone or in combination with other conductive fillers. The polymer of the first layer or the outer layer can be polyimide (thermosetting or thermoplastic, including fluorinated polyimide), or other polymers including polyester, polycarbonate, polyamideimide, polyphenylene sulfide, polyamide, polysulfone, polyetherimide, PVDF, polyethylene-co-polytetrafluoroethylene, etc., and their blends.

The core shell conductive metal oxide includes a metal oxide core and a hydrophobic POSS shell. The primary particle size of the disclosed core shell filler is from about 15 nanometers to about 5,000 nanometers, or from about 20 nanometers to about 1,000 nanometers, or from about 40 nanometers to about 400 nanometers, where the POSS shell is present in an amount of from about 1 weight percent to about 50 weight percent, or from about 5 weight percent to about 30 weight percent of the core shell particle; the metal oxide core is present in an amount of from about 50 weight percent to about 99 weight percent, or from about 70 weight percent to about 95 weight percent of the core shell particle.

The Examples of the metal oxide core include tin oxide, antimony-doped tin oxide, indium oxide, indium-doped tin oxide, zinc oxide, titanium oxide, etc. In an embodiment, the electrically conductive metal oxide core is antimony doped tin oxide. Suitable antimony doped tin oxide examples are T-1 from Mitsubishi Chemical, or ZELEC® ECP-3005-XC and ZELEC® ECP-3010-XC from of DuPont Chemicals.

In another embodiment, the electrically conductive metal oxide core is antimony doped tin oxide coated on an inert core particle (e.g., ZELEC® ECP-S, M and T). ZELEC® is a trademark of DuPont Chemicals Jackson Laboratories, Deepwater, N.J. The core particle may be mica, $TiO_2$ or acicular particles having a hollow or a solid core.

In another embodiment, the antimony doped tin oxide particles are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure. Forms of antimony doped tin oxide are commercially available under the tradename ZELEC® ECP (electroconductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC ECP-T), and a plate shaped mica core product (ZELEC® ECP-M).

The POSS shell can be chemically grafted onto or attached to the metal oxide surface via a functional POSS such as a POSS silanol. Other functional POSS such as POSS alcohols, POSS amines, POSS carboxylic acids or POSS epoxides can also be used to modify the metal oxide. The POSS shell is present in an amount of from about 1 weight percent to about 50 weight percent, or from about 5 weight percent to about 30 weight percent of the core shell particle.

Examples of POSS silanol include isobutyl-POSS cyclohexenyldimethylsilyldisilanol or isobutyl-polyhedral oligomeric silsesquioxane cyclohexenyldimethylsilyldisilanol, cyclopentyl-POSS dimethylphenyldisilanol, cyclohexyl-POSS dimethylvinyldisilanol, cyclopentyl-POSS dimethylvinyldisilanol, isobutyl-POSS dimethylvinyldisilanol, cyclopentyl-POSS disilanol, isobutyl-POSS disilanol, isobutyl-POSS epoxycyclohexyldisilanol, cyclopentyl-POSS fluoro(3)disilanol, cyclopentyl-POSS fluoro(13)disilanol, isobutyl-POSS fluoro(13)disilanol, cyclohexyl-POSS methacryldisilanol, cyclopentyl-POSS methacryldisilanol, isobutyl-POSS methacryldisilanol, cyclohexyl-POSS monosilanol, cyclopentyl-POSS monosilanol, isobutyl-POSS monosilanol, cyclohexyl-POSS norbornenylethyldisilanol, cyclopentyl-POSS norbornenylethyldisilanol, isobutyl-POSS norbornenylethyldisilanol, cyclohexyl-POSS TMS disilanol, isobutyl-POSS TMS disilanol, cyclohexyl-POSS trisilanol, cyclopentyl-POSS trisilanol, isobutyl-POSS trisilanol, isooctyl-POSS trisilanol, phenyl-POSS trisilanol, and the like, all believed to be commercially available from Hybrid Plastics, Hattiesburg, Miss.

Typical POSS silanol examples isobutyl-POSS trisilanol, isooctyl-POSS trisilanol, phenyl-POSS trisilanol, respectively represented by

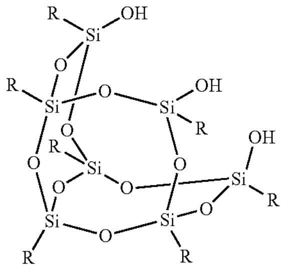

R = i-octyl

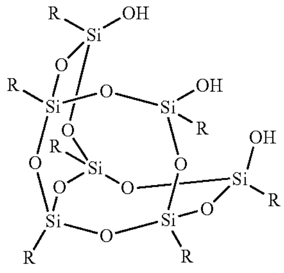

R = i-butyl

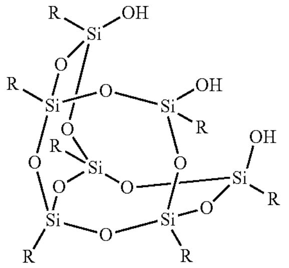

R = phenyl

POSS alcohol examples include TMP diolisobutyl POSS, trans-cyclohexanediolisobutyl POSS, 1,2-propanediolisobutyl POSS, octa(3-hydroxy-3-methylbutyldimethylsiloxy) POSS, all available from Hybrid Plastics Inc., Hattiesburg, Miss.

POSS epoxide examples include epoxycyclohexylisobutyl POSS, glycidylethyl POSS, glycidylisobutyl POSS, glycidylisooctyl POSS, triglycidylcyclohexyl POSS, triglycidylisobutyl POSS, glycidylphenyl POSS, octaepoxycyclohexyldimethylsilyl POSS, octaglycidyldimethylsilyl POSS, all available from Hybrid Plastics Inc., Hattiesburg, Miss.

POSS carboxylic acid examples include amic acid-cyclohexyl POSS, amic acid-isobutyl POSS, amic acid-phenyl POSS, octa amic acid POSS, all available from Hybrid Plastics Inc., Hattiesburg, Miss.

POSS amine examples include aminopropylisobutyl POSS, aminopropylisooctyl POSS, aminopropylphenyl POSS, aminoethylaminopropylisobutyl POSS, octaminophenyl POSS, N-phenylaminopropyl POSS, N-methylaminopropylisobutyl POSS, octaammonium POSS, p-aminophenylcyclohexyl POSS, m-aminophenylcyclohexyl POSS, p-aminophenylisobutyl POSS, m-aminophenylisobutyl POSS, all available from Hybrid Plastics Inc., Hattiesburg, Miss.

The first polymer layer 50 and the outer polymer layer 52 can be made from a number of different materials, including polyesters, polyurethanes, polyimides, fluorinated polyimides, polyolefins (such as polyethylene and polypropylene, polyethylene-co-polytetrafluoroethylene), polyamides (including polyamideimides), polyetherimides, polyphenylene sulfides, polysulfones, polycarbonates, PVDF or acrylics, or blends or alloys of such materials.

In the first polymer layer 50 appropriate additional fillers 58 can include, for example, carbon, fluorinated carbon black, polyaniline, polythiophenes or other metal oxides. Donor salts can also be used.

The core shell POSS electrically conductive particles 51 dispersed in the outer polymer layer 52 decrease the resistivity into the desired surface resistivity range of from about $10^8$ ohms/square, to about $10^{13}$ ohms/square, or from about $10^9$ ohms/square, to about $10^{12}$ ohms/square. The volume resistivity is from about $10^7$ ohm-cm to about $10^{12}$ ohm-cm, or from about $10^8$ ohm-cm to about $10^{11}$ ohm-cm. The resistivity can be provided by varying the concentration of the conductive particles. The core shell POSS electrically conductive particles 51 may be present in an amount of from about 1 weight percent to about 60 weight percent, or from about 5 weight percent to about 40 weight percent, or from about 10 weight percent to about 30 weight percent of total solids of the intermediate transfer member.

Polyimide examples are inclusive of rapidly cured polyimide polymers, such as VTEC™ PI 1388, 080-051, 851, 302, 203, 201, and PETI-5, all available from Richard Blaine International, Incorporated, Reading, Pa. Also, other thermosetting polyimides that can be cured at temperatures of above 300° C. include PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be used in the intermediate transfer member are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Also, polyimides that may be selected as the intermediate transfer member may be prepared as fully imidized polymers which do not contain any "amic" acid, and do not require high temperature cure to convert them to the imide form.

Examples of specific selected thermoplastic polyimides included in the intermediate transfer member, especially the core shell thereof, are KAPTON® KJ, commercially available from E.I. DuPont, Wilmington, Del., as represented by

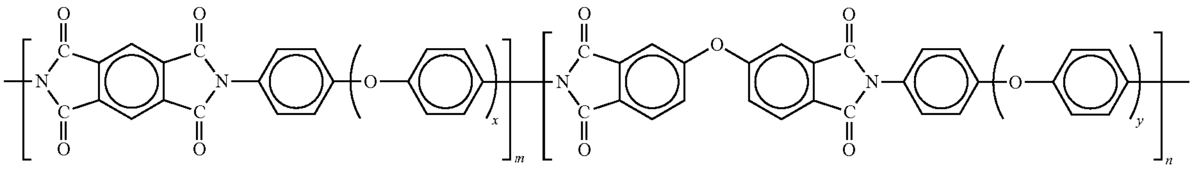

wherein x is equal to 2; y is equal to 2; m and n are from about 10 to about 300; and IMIDEX®, commercially available from West Lake Plastic Company, as represented by

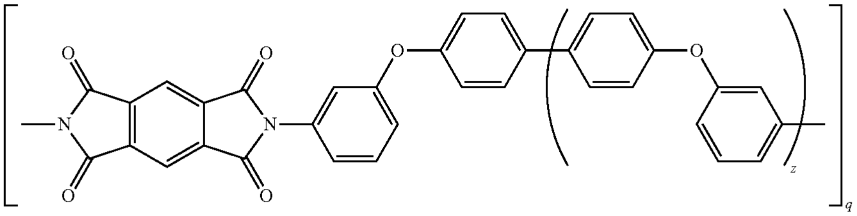

wherein z is equal to 1, and q is from about 10 to about 300.

Examples of polycarbonate binders selected include poly (4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, the intermediate transfer member binders are comprised of bisphenol-A-polycarbonate resins, commercially available as MAKROLON®, with a weight average molecular weight of from about 50,000 to about 500,000.

The thickness of the outer layer is from about 1 micron to about 150 microns, or from about 10 microns to about 100 microns.

A method of manufacturing the intermediate transfer member includes mixing conductive particles, polyhedral oligomeric silsequioxane silane (POSS) having functional groups and a solvent to form a mixture. Examples of the solvent selected to form the dispersion include methylene chloride, tetrahydrofuran, ethanol, acetone, ethyl acetate, chloroform, hexane, toluene and the like where the solvent is selected, for example, in an amount of from about 50 weight percent to about 95 weight percent, and from 70 weight percent to about 90 weight percent based on the amounts in the reaction mixture. The mixture is heated and filtered. The mixture is washed to obtain conductive particles with a POSS shell. The conductive particles with a POSS shell are dispersed in a polymer and a solvent. The dispersion can be milled if necessary. Examples of the solvent used to make the dispersion include toluene, hexane, cyclohexane, heptane, tetrahydrofuran, methyl ethyl ketone, methyl isobutyl ketone, N,N'-dimethylformamide, N,N'-dimethylacetamide, N-methylpyrrolidone, methylene chloride and the like and mixtures thereof. The dispersion of polymer and conductive particles with a POSS shell is coated on a layer of a first polymer and cured.

The outer polymer layer is coated on the first polymer layer in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

Additives and additional fillers may be present in any of the above-described layers.

Specific embodiments will now be described in detail. These examples are intended to be illustrative, and not limited to the materials, conditions, or process parameters set forth in these embodiments. All parts are percentages by solid weight unless otherwise indicated.

EXAMPLES

POSS metal oxide core-shell conductive particles were prepared as follows. The preparation involves the strong interaction between the basic metal-OH from metal oxide and the acidic Si—OH from POSS silanol. Eight grams of trisilanolisooctyl POSS® (SO1455 from Hybrid Plastics), 40 grams of antimony doped tin oxide (T-1 from Mitsubishi Chemical) and 300 milliliters of n-hexane were well mixed and heated to about 60° C. for about 8 hours. The mixture was then filtered, and the solid was collected and washed with n-hexane twice to completely remove any residual POSS silanol. The resulting solid was dried under vacuum overnight. The antimony doped tin oxide POSS core shell conductive particles were analyzed via XPS for elemental analysis on the metal oxide surface, and there was about 2.5 atom percent of silicon on the metal oxide surface.

The resulting antimony doped tin oxide POSS core shell conductive particles were then dispersed in a polymeric solution to prepare an intermediate transfer member coating dispersion. The antimony doped tin oxide POSS core shell conductive particles were milled in a polycarbonate/polyester blend (MAKROLON® 5705/PE2200=98/2) in methylene chloride at varying ratios using 2 mm stainless shots overnight. PE2200 is a copolyester of isoterephthalic acid, dimethylpropanediol, and ethanediol having a melting point of from about 302° C. to about 320° C. (degrees Centigrade), commercially available from Shell Oil Company, Houston, Tex., and MAKROLON® 5705 is a known polycarbonate resin having a $M_w$ molecular weight average of from about 50,000 to about 100,000, commercially available from Farbenfabriken Bayer A.G. The dispersions were then filtered though a 20 μm Nylon cloth. Uniform dispersions were obtained, and then coated on a polyimide polymer layer such as a polyimide/polyaniline layer using a draw bar coating method. The resulting dual layer intermediate transfer member included a 75 μm polyimide base layer and a 25 μm antimony doped tin oxide POSS core shell filler surface layer was dried at 120° C. for 10 minutes, and excellent adhesion was observed between the two layers.

The disclosed dual layer Example 1 ITB member is expected to exhibit stable resistivity in humid environments due to the water expelling nature of the core shell particle present in the surface layer.

The contact angles of water on the dual layer intermediate transfer members were measured at ambient temperature (about 23° C.) using Contact Angle System OCA (Dataphysics Instruments GmbH, model OCA15). Deionized water was used. At least ten measurements were performed and their averages were also reported in Table 1.

TABLE 1

| | Contact angle (°) |
|---|---|
| Comparative Example 1, with the core particle (no POSS shell) surface layer | 78 ± 1 |
| Example 1, with the core shell particle (the POSS shell) surface layer | 102 ± 1 |

The disclosed Example 1 ITB device exhibited a 24° higher contact angle than the Comparable Example 1 ITB device, which higher angle (lower surface energy) will result in improved toner transfer and cleaning.

In addition, the antimony doped tin oxide POSS core shell conductive particles also imparted improved mechanical properties of the intermediate transfer member due to its nanocomposite nature.

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

What is claimed is:

1. An intermediate transfer member comprising:

a substrate layer; and a surface layer disposed on the substrate layer comprising conductive core-shell particles, wherein a core is selected from the group consisting of: tin oxide, antimony-doped tin oxide, a layer of antimony doped tin oxide on an inert core particle, indium oxide, indium-doped tin oxide, zinc oxide and titanium oxide, aluminum doped tin oxide and indium doped tin trioxide, and a shell comprises a polyhedral oligomeric silsequioxane, wherein the conductive core-shell particles are dispersed in a polymer.

2. The intermediate transfer member of claim 1 wherein the polyhedral oligomeric silsequioxane is functionalized with groups selected from the group consisting of silanols, alcohols, amines, carboxylic acids and epoxides.

3. The intermediate transfer member of claim 1 wherein the conductive core-shell particles comprise a particles size of from about 15 nanometers to about 5000 nanometers.

4. The intermediate transfer member of claim 1 wherein the shell comprises from about 1 weight percent to about 50 weight percent of the conductive core-shell particles.

5. The intermediate transfer member of claim 1 wherein the substrate layer comprises a polymer selected from the group consisting of polyesters, polyurethanes, polyimides, fluorinated polyimides, polyamideimdes, polyolefins, polyamides, polyetherimides, polyphenylene sulfides, polysulfones, polycarbonates, PVDF and acrylics.

6. The intermediate transfer member of claim 1 wherein the polymer is selected from the group consisting of polyesters, polyurethanes, polyimides, fluorinated polyimides, polyamideimides, polyolefins, polyamides, polyetherimides, polyphenylene sulfides, polysulfones, polycarbonates, PVDF and acrylics.

7. The intermediate transfer member of claim 1 wherein the polyhedral oligomeric silsequioxane shell is attached onto the core through functionalized polyhedral oligomeric silsequioxane (POSS) selected from the group consisting of isobutyl-POSS cyclohexenyldimethylsilyldisilanol, isobutyl-POSS cyclohexenyldimethylsilyldisilanol, cyclopentyl-POSS dimethylphenyldisilanol, cyclohexyl-POSS dimethylvinyldisilanol, cyclopentyl-POSS dimethylvinyldisilanol, isobutyl-POSS dimethylvinyldisilanol, cyclopentyl-POSS disilanol, isobutyl-POSS disilanol, isobutyl-POSS epoxycyclohexyldisilanol, cyclopentyl-POSS fluoro(3)disilanol, cyclopentyl-POSS fluoro(13)disilanol, isobutyl-POSS fluoro(13)disilanol, cyclohexyl-POSS methacryldisilanol, cyclopentyl-POSS methacryldisilanol, isobutyl-POSS methacryldisilanol, cyclohexyl-POSS monosilanol, cyclopentyl-POSS monosilanol, isobutyl-POSS monosilanol, cyclohexyl-POSS norbornenylethyldisilanol, cyclopentyl-POSS norbornenylethyldisilanol, isobutyl-POSS norbornenylethyldisilanol, cyclohexyl-POSS TMS disilanol, isobutyl-POSS TMS disilanol, cyclohexyl-POSS trisilanol, cyclopentyl-POSS trisilanol, isobutyl-POSS trisilanol, isooctyl-POSS trisilanol, phenyl-POSS trisilanol, TMP diolisobutyl POSS, trans-cyclohexanediolisobutyl POSS, 1,2-propanediolisobutyl POSS, octa(3-hydroxy-3-methylbutyldimethylsiloxy) POSS, epoxycyclohexylisobutyl POSS, glycidylethyl POSS, glycidylisobutyl POSS, glycidylisooctyl POSS, triglycidylcyclohexyl POSS, triglycidylisobutyl POSS, glycidylphenyl POSS, octaepoxycyclohexyldimethylsilyl POSS, octaglycidyldimethylsilyl POSS, amic acid-cyclohexyl POSS, amic acid-isobutyl POSS, amic acid-phenyl POSS, octa amic acid POSS, aminopropylisobutyl POSS, aminopropylisooctyl POSS, aminopropylphenyl POSS, aminoethylaminopropylisobutyl POSS, octaminophenyl POSS, N-phenylaminopropyl POSS, N-methylaminopropylisobutyl POSS, octaammonium POSS, p-aminophenylcyclohexyl POSS, m-aminophenylcyclohexyl POSS, p-aminophenylisobutyl POSS and m-aminophenylisobutyl POSS.

8. The intermediate transfer member of claim 1, wherein the substrate layer further comprises a filler selected from the group consisting of carbon black, polyaniline, polythiophene, metal oxides and donor salts.

9. The intermediate transfer member of claim 1 wherein the surface layer comprises a water contact angle of greater than about 80°.

10. The intermediate transfer member of claim 1 wherein the conductive core-shell particles comprise from about 1 to about 60 weight percent of total solids of the surface layer.

11. The intermediate transfer member of claim 1 wherein the surface layer comprises a surface resistivity of from about $10^8$ Ω/square to about $10^{13}$ Ω/square.

12. The intermediate transfer member of claim 1 wherein the surface layer has a thickness of from about 1 micron to about 150 microns.

13. An intermediate transfer member comprising:

a substrate layer; and a surface layer disposed on the substrate layer comprising conductive core-shell particles, wherein the core is selected from the group consisting of: tin oxide, antimony-doped tin oxide, a layer of antimony doped tin oxide on an inert core particle, indium oxide, indium-doped tin oxide, zinc oxide and titanium oxide, aluminum doped tin oxide and indium doped tin trioxide, the conductive particles, and a shell comprises a polyhedral oligomeric silsequioxane, the conductive core-shell particles dispersed in a polymer wherein the surface layer has surface contact angle of greater than 80° and a surface resistivity of from about $10^8$ Ω/square to about $10^{13}$ Ω/square and a thickness of from about 1 micron to about 150 microns.

14. A method of manufacturing and intermediate transfer member comprising:

mixing conductive particles selected from the group consisting of: tin oxide, antimony-doped tin oxide, a layer of antimony doped tin oxide on an inert core particle, indium oxide, indium-doped tin oxide, zinc oxide and titanium oxide, aluminum doped tin oxide and indium doped tin trioxide, a functionalized polyhedral oligomeric silsequioxane (POSS) and a solvent to form a mixture;

heating the mixture;

filtering the mixture;

washing the mixture to obtain conductive particles with a POSS shell;

dispersing the conductive particles with the POSS shell in a polymer to form a dispersion;

coating the dispersion on a substrate; and drying the coating.

15. The method of claim 14 wherein the functionalized polyhedral oligomeric silsequioxane is functionalized with groups selected from the group consisting of silanols, alcohols, amines, carboxylic acids and epoxides.

16. The method of claim 14 wherein the polymer is selected from the group consisting of polyesters, polyurethanes, polyimides, fluorinated polyimides, polyamideimides, polyolefins, polyamides, polyetherimides, polyphenylene sulfides, polysulfones, polycarbonates, PVDF and acrylics.

17. The method of claim 14 wherein the solvent is selected from the group consisting of toluene, hexane, cycloheaxne, heptane, tetrahydrofuran, methyl ethyl ketone, methyl isobutyl ketone, N,N'-dimethylformamide, N,N'-dimethylacetamide, N-methyl pyrrolidone and methylene chloride.

* * * * *